US005328602A

United States Patent [19]

Brooks

[11] Patent Number: 5,328,602

[45] Date of Patent: Jul. 12, 1994

[54] WATER SKIMMER

[75] Inventor: Loren C. Brooks, Monmouth, Oreg.

[73] Assignee: Marquis Corp., Independence, Oreg.

[21] Appl. No.: 959,350

[22] Filed: Oct. 13, 1992

[51] Int. Cl.[5] .............................................. B01D 35/00

[52] U.S. Cl. ................................ 210/169; 210/416.2; 4/509; 4/541.1

[58] Field of Search ...................... 210/163, 169, 416.2; 4/538, 584, 668, 545, 507, 510, 509, 490, 541.1; 15/1.7

[56] References Cited

U.S. PATENT DOCUMENTS

| | | | |
|---|---|---|---|
| 2,994,433 | 8/1961 | Sandin | 210/163 |
| 3,036,712 | 5/1962 | Barbara | 210/169 |
| 3,186,550 | 6/1965 | Beduhn | 210/169 |
| 3,263,811 | 8/1966 | Baker et al. | 210/136 |
| 3,268,079 | 8/1966 | Sharrow, Jr. | 210/169 |
| 3,372,809 | 3/1968 | Spitzer | 210/169 |
| 3,579,657 | 5/1971 | Gurrieri | 4/490 |
| 3,616,918 | 11/1971 | Diemond et al. | 210/169 |
| 3,616,923 | 11/1971 | Haley | 4/510 |
| 3,667,611 | 6/1972 | Pansini | 210/163 |
| 3,718,148 | 2/1973 | Gibellina | 4/490 |
| 3,774,767 | 11/1973 | Field | 210/169 |
| 3,884,809 | 5/1975 | Logsdon | 210/163 |
| 4,233,694 | 11/1980 | Janosko et al. | 210/169 |
| 4,348,192 | 9/1982 | Pansini | 4/490 |
| 4,455,695 | 6/1984 | Mikhel | 210/169 |
| 4,533,476 | 8/1985 | Watkins | 210/169 |
| 4,552,658 | 11/1985 | Adcock et al. | 210/169 |
| 4,781,827 | 11/1988 | Shields | 210/169 |
| 4,818,389 | 4/1989 | Tobias et al. | 210/169 |
| 4,832,838 | 5/1989 | Stone | 15/1.7 |
| 4,868,934 | 9/1989 | Altman | 4/490 |

FOREIGN PATENT DOCUMENTS

| | | |
|---|---|---|
| 211482 | 7/1909 | Fed. Rep. of Germany . |
| 236391 | 7/1911 | Fed. Rep. of Germany . |

*Primary Examiner*—Peter A. Hruskoci
*Assistant Examiner*—Robert James Popovics
*Attorney, Agent, or Firm*—Kolisch, Hartwell, Dickinson, McCormack & Heuser

[57] ABSTRACT

A skimmer for an installation confining a pool of water through which surface water exits from the installation. The skimmer has a hollow dome with openings in the sides of the dome. The skimmer has a tray with a perforate floor extending under the base of the dome. Surface water cascades through the openings and downwardly within the dome to thence flow through the floor of the tray.

8 Claims, 2 Drawing Sheets

WATER SKIMMER

BACKGROUND AND SUMMARY OF THE INVENTION

The present invention relates to water skimmers, and more particularly to a skimmer which may be incorporated with a means containing a pool of water for the purpose of skimming off surface water of the pool. Exemplary of installations with which the skimmer may be used are swimming pools, and what are known as hot tubs or spas.

A problem encountered with any confined pool of water is that after a period of use, oils and other debris tend to collect on the surface of the water of the pool spa. This material must be removed by filtering the water when the water is recirculated. A drain opening that merely opens to the pool water at a level slightly below its surface is not effective to remove an oil surface layer, as this type of drain leaves undisturbed the oil film on the surface of the water. So-called "skimmers" have been developed which operate to skim off and remove surface water and any oil film and other debris contained thereon.

A common form of skimmer includes what is known as a floating weir, with the weir through buoyancy seeking a proper level with respect to the level of the surface water. Surface water falls over the top of the weir to be skimmed off when being recirculated. In other forms of skimmers, the drain opening which receives the water being recirculated is itself a part of a floating mechanism seeking a proper level in the pool water being processed. In skimmers as just described, movable mechanisms are required, which are subject to breakdown and require maintenance. Another characteristic of some known skimmers is that they require a recessed construction in the wall structure which confines the water of the system, making them inappropriate for smaller units such as portable-type spas, where space within a spa is limited. Another consideration entering into an acceptable construction for a skimmer is that it be able to perform properly regardless of variation in the normal operating level of the water being recirculated. Additionally, of course, the skimmer should not be hazardous to users, and thus introduce a safety problem. As a practical matter, a skimmer should be simply constructed and easily maintained.

A general object of the present invention is to provide a simple and effective skimmer to remove oils and debris from the surface of water in a confined pool of water which does not rely on floating or moving parts.

The skimmer accomplishes a skimming action by creating a swirling action or vortex in surface water flowing into a hollow element of the skimmer. The mixing action that results is effective to break surface tension, whereby oil and debris are entrained in the water. The water with the entrained oils and debris is then pulled through a perforate strainer in the floor of the skimmer and into a filter by a pump.

More particularly, an object of the invention is to provide a skimmer that is compact and suitable for use where space is limited, as in portable spas.

Yet another object is to provide a skimmer that is easily cleaned by hand.

The skimming of the preferred embodiment of the invention does not require a recessed wall for its installation. This contributes to its usefulness with a portable spa where space is limited.

BRIEF DESCRIPTION OF THE DRAWINGS

These and other objects and advantages are attained by the invention, which is described herein below in conjunction with the accompanying drawings, wherein.

DETAILED DESCRIPTION OF THE PREFERRED EMBODIMENT

Figure 1:
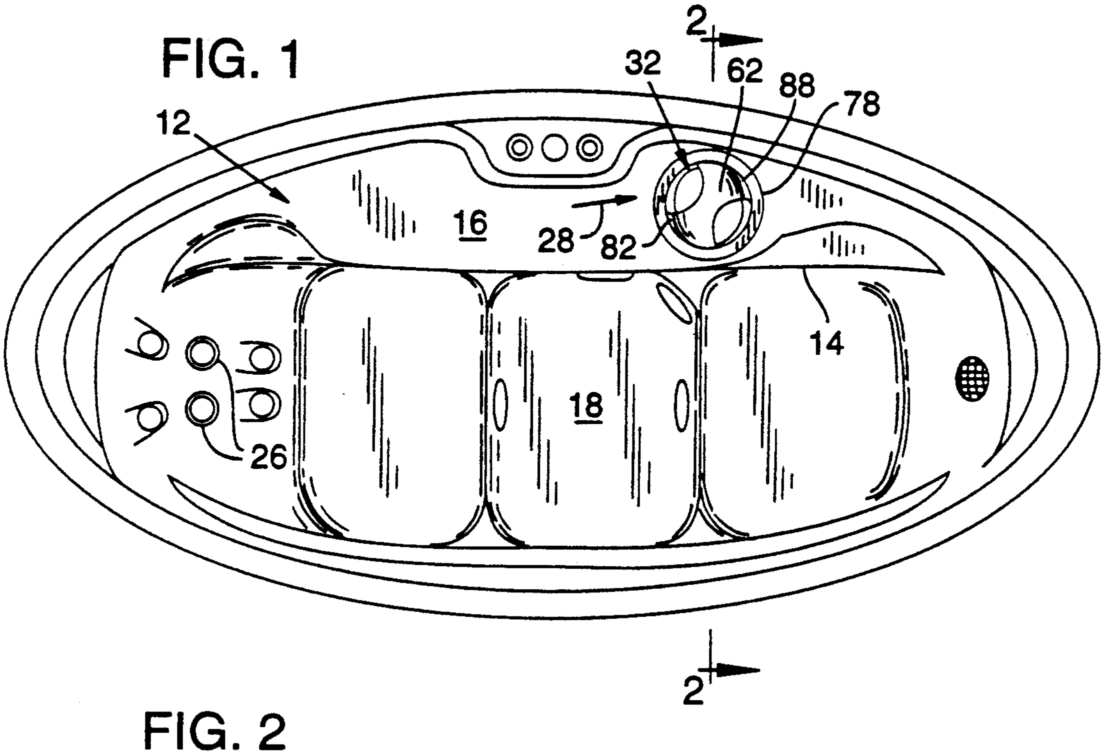
FIG. 1 is a top plan view of a spa equipped with the skimmer of the present invention.

The skimmer is described below in conjunction with a spa, although the skimmer obviously has other applications.

Referring to the drawings, the spa illustrated comprises what is referred to as a water-filled enclosure 12, with upright side walls 14, a horizontal ledge expanse 16, and a floor 18, that form a hollow water-holding interior of the spa or pool-containing unit. Water in the unit has a surface level indicated at 24, and water at or near the surface level is referred to herein as surface water. Jets, including those shown at 26, are part of a circulation system in the unit, and serve to eject recirculated water into the interior of the unit. Operation of the circulation system causes water to flow in a flow path as shown by the arrow 28.

Horizontal ledge expanse is provided with a hole 30, used in mounting a skimmer and filter assembly, as will now be described.

Surface water is removed from the unit with a circulation system which includes a skimmer 32, a filter assembly 34, and a pump (not shown) which has its intake connected to an intake conduit 42. With operation of the pump, surface water is pulled downwardly through the skimmer and filter assembly 34, later to be returned as by discharge jets, as exemplified by jets 26.

Filter assembly 34 includes a filter housing 44 located below hole 30 and secured in a suitable manner to the underside of ledge 16. Contained within the filter housing is conventional filtering material for filtering the water processed by the filter.

Figure 3:
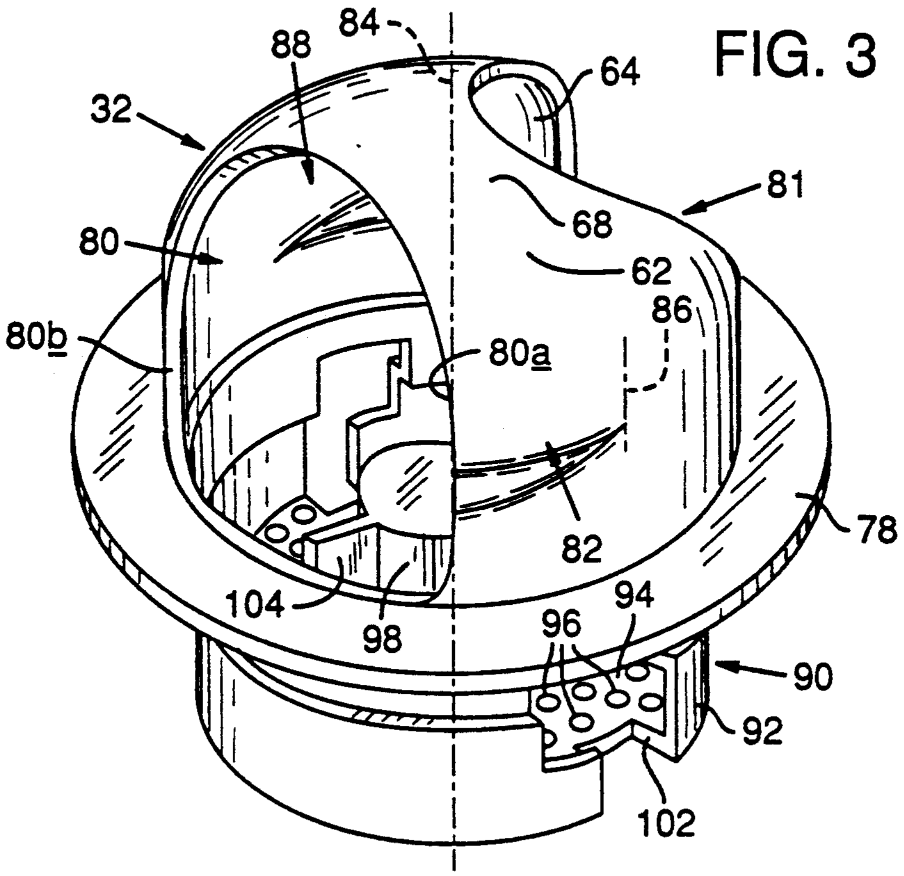
FIG. 3 is a perspective view of the skimmer of the present invention shown removed from the spa.
Figure 4:
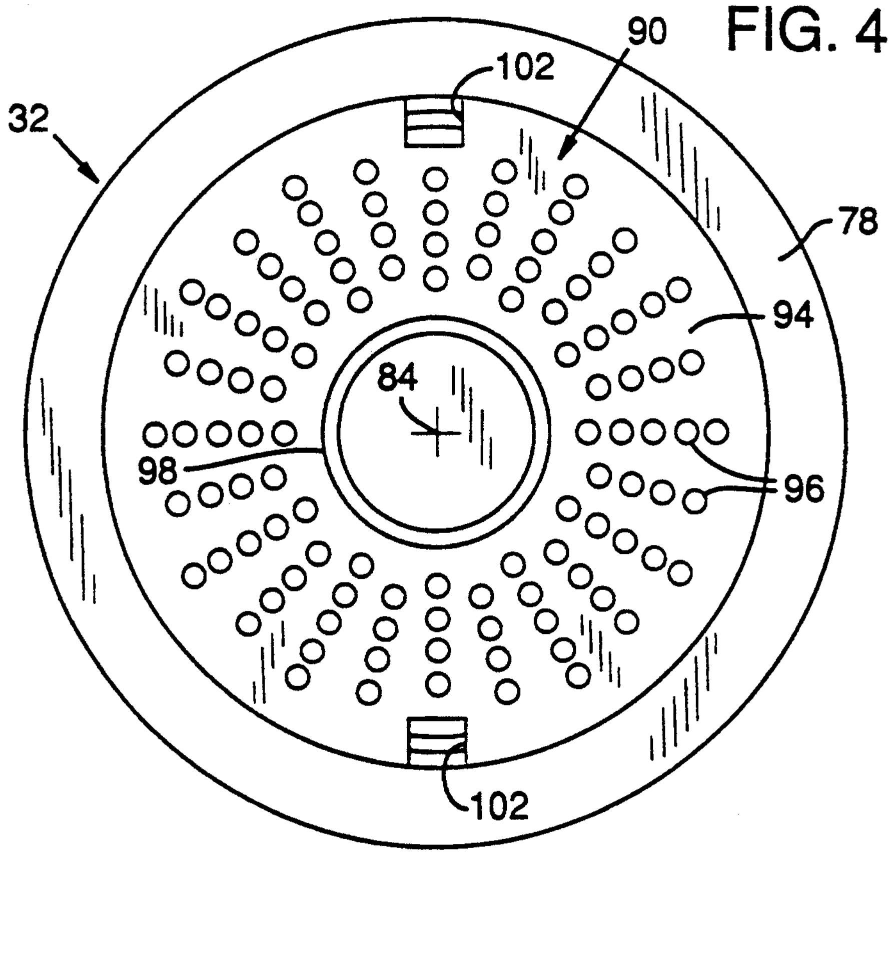
FIG. 4 is a bottom plan view of the skimmer of the present invention shown removed from the spa.

Referring now more particularly to FIGS. 3 and 4, skimmer 32 includes an upper, hollow dome portion 62 and with a hollow interior 64. The top of the dome portion is formed by a cap 68. Adjacent the base of dome 62 is an annular flange or mounting portion 78 used in mounting the skimmer.

Dome portion 62 is provided with a pair of oppositely disposed openings 80, 81, each of which extends from adjacent the base of the dome portion or flange 78, to adjacent the top of the dome portion or cap 68. The openings are of substantial size, to enable a hand, for instance, to be placed into the interior of the skimmer, as when required to clean it. In operation, surface water in the spa flows into the openings, and then with a swirling action or the formation of a vortex continues to cascade downwardly through the interior of the skimmer.

The dome is provided with a pair of helically curved portions, as exemplified by portion 82 which faces the viewer in FIG. 3. Portion 82 curves about axis 84 of the skimmer helically inwardly, progressing from region 86 to where the curvature stops, which is at edge 80a of the opening 80. With edge 80a terminating this helically curved portion, this edge is somewhat radially inwardly of opposite edge 80b of the opening. Helically curved portion 88 on the opposite side of the dome is similarly constructed.

Forming the bottom of the skimmer is what is referred to herein as a strainer tray portion 90. Such includes an upstanding generally cylindrical rim wall 92 and a perforate floor portion 94 with perforations 96.

The center of the tray portion 90 includes a hub 98. This fits over filter structure provided in the filter housing. Water that flows through the skimmer is directed outwardly by the hub with such flowing through perforations 96.

Opposite sides of the tray portion 90 are notched as at 102, each notch extending through rim wall 92 and a part of floor portion 94. These notches are used in securing the skimmer in place on ledge expanse 16.

In mounting the skimmer in place, the skimmer is placed over hole 30 and lowered into position, with rim wall 92 moving through the hole and flange 78 then coming to rest against the margin of ledge expanse 16 which surrounds the hole. With turning of the skimmer about its axis, locking structure within the filter housing (not illustrated) engages the skimmer through its notches 102 to lock the skimmer in place. Turning of the skimmer is facilitated using tabs such as tab 104 joined to hub 98 and accessible through openings 80, 81.

Figure 2:
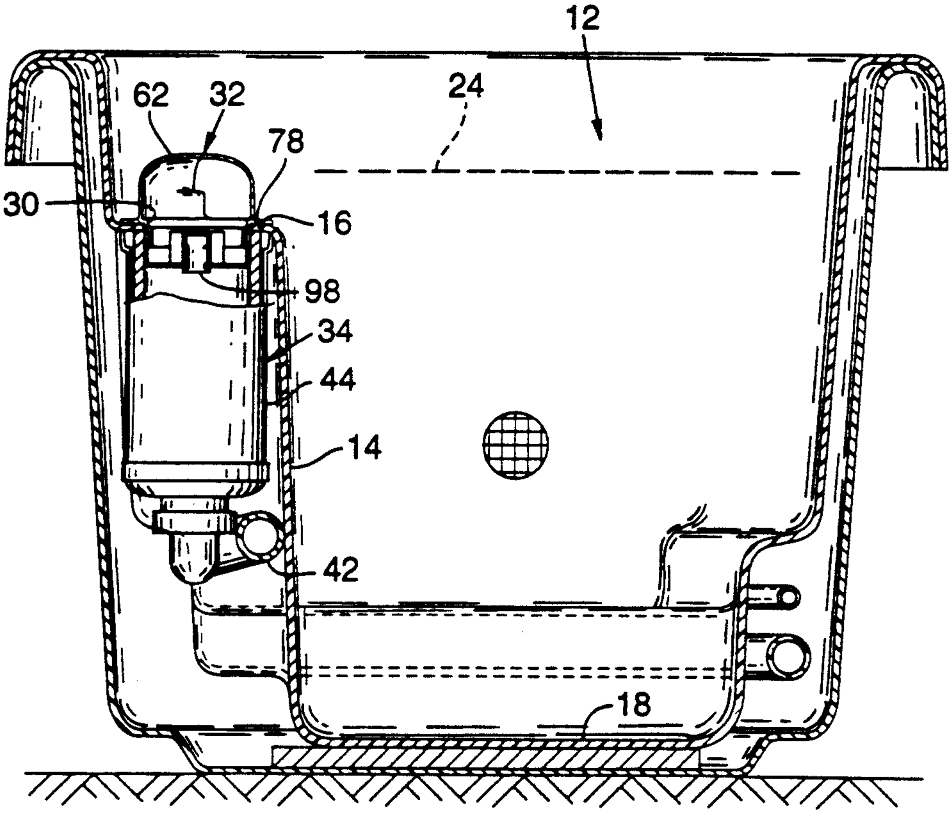
FIG. 2 is a cross-sectional view of the spa, taken generally along the line 2—2 in FIG. 1.

With the skimmer in place and operational, and with reference to FIG. 2, the surface of the water within the unit is approximately at the level indicated at 24. This surface water together with any oil film thereon and other debris, at the location of the skimmer, swirls about the dome of the skimmer and thence through openings, 80, 81 into the skimmer interior. This movement occurs together with a turbulence in the water and the oil whereby both are carried into the skimmer interior. The water and other material entrained therewith travels downwardly inside the skimmer into tray portion 90. Larger pieces of debris collect on the floor of the tray portion, while the oil and water mixture, and smaller particles of debris, travel through the perforations in the tray floor. This material is then filtered by the filter media within the filter housing.

The skimmer may be easily removed for cleaning purposes, if desired. The skimmer is easily washed when removed from an installed position.

If the skimmer of the instant invention is contrasted with conventional skimmers, it will be noted that the skimmer has no moving parts such as characterizes known skimmers that either float on the water surface or employ a movable weir with buoyant means serving to position the weir with its top at a proper level.

It should also be noted that the skimmer does not require a recess in the side of the spa for its mounting, as does a weir-type skimmer where water flows over a weir and thence into some sort of drain structure. Further, the skimmer has a relatively small size. These features contribute to space savings and make the skimmer well-suited for incorporation with portable spas where space is limited.

The exposed portion of the skimmer, which is the upper curved expanse of the dome portion in the skimmer, has a neat appearance. The dome portion is not easily damaged, in the event of inadvertently being struck. The dome portion being rounded is devoid of sharp angular portions which could be hazardous to users. Different design configurations are readily possible, with suitable change in the configuration of the molds producing the skimmer.

Different design configurations are readily possible, with suitable change in the configuration of the molds producing the skimmer sections. The skimmer is relatively light in weight, making it well suited for use with mobile or portable units.

While an embodiment of the invention has been described, it is obvious that changes and variations are possible without departing from the invention.

It is claimed and desired to secure by Letters Patent:

1. In combination with an installation having a floor and upright side walls extending up from the floor defining a hollow water-holding interior for the installation, a skimmer positioned within said interior at an elevation above said floor for draining surface water from water held within said interior, said skimmer comprising a dome with a base and a cap, and the dome arching upwardly extending from said base to said cap, a mounting for the dome securing the dome in a fixed position within said interior, an opening for the flow of surface water into the dome, and said opening extending from adjacent the base to adjacent the cap of the dome, and a skimmer outlet for draining water out from the base of the skimmer, a filter housing mounted below said base, and a source of suction connected to said housing.

2. The combination of claim 1, wherein the dome has an upright axis and a side wall portion that helically curves about said axis, and wherein said opening is defined by a first side edge and an opposed second side edge, and said side wall portion terminates at said first side edge, with the first side edge being spaced radially inwardly of the second side edge.

3. The combination of claim 1, wherein the skimmer further includes a perforate strainer extending as a floor under the base of said dome, said opening has a bottom located above said strainer, and said skimmer outlet is below said strainer.

4. The combination of claim 1, wherein the skimmer further comprises a tray with the tray including a floor and an upright bordering rim wall, the rim wall is joined to the base of the dome, and the floor of the tray is perforate.

5. The combination of claim 4, wherein a side wall of the installation includes a normally submerged essentially horizontal ledge expanse, the mounting for the skimmer secures the skimmer with the base of the dome above and against said ledge expanse, and which further includes a pump for circulating water having an intake, and the intake of said pump connects through said ledge expense to the interior of said dome.

6. The combination of claim 1, wherein said source of suction comprises a pump for circulating water within the installation and the pump having an intake, said filter housing having an interior, and filtering material within the interior of the filter housing, and the filter housing is connected to the intake of the pump, and a connection connects the interior of the filter housing with said skimmer outlet.

7. The combination of claim 6, wherein the skimmer further comprises a tray with the tray including a floor and an upright bordering rim wall, the rim wall is joined to the base of the dome, the filter housing includes a protruding tab, and the rim wall includes a slot within which the tab seats to mount the skimmer to the filter housing.

8. In combination with a spa having upright side walls defining a hollow water-holding interior for the spa, one side wall of the spa including a normally submerged substantially horizontal ledge expanse, a skimmer for draining surface water from the water within the spa interior, said skimmer including a dome with an open base and a cap, a mounting for the dome mounting the dome in a fixed position within the interior of the spa and on said ledge expanse, said dome having an opening extending from adjacent the base of the dome to adjacent the cap of the dome accommodating the flow of surface water into the dome, the skimmer further including a tray portion joined to and enclosing off the base of said dome and the tray portion including a perforate floor forming a strainer at the base of the skimmer, a pump with a pump intake for circulating spa water, a filter housing having filtering material within it connecting with the intake of the pump, the filter housing and the pump being located on the outside of the spa, wherein the interior of said dome connects through said tray portion with the interior of said filter housing.

* * * * *